United States Patent
Agarwal

(10) Patent No.: US 8,433,332 B2
(45) Date of Patent: *Apr. 30, 2013

(54) DYNAMIC FREQUENCY ASSIGNMENT IN A MULTI-BEAM SYSTEM

(75) Inventor: Anil Agarwal, North Potomoc, MD (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/569,641

(22) Filed: Aug. 8, 2012

(65) Prior Publication Data

US 2012/0300697 A1    Nov. 29, 2012

Related U.S. Application Data

(63) Continuation of application No. 12/615,483, filed on Nov. 10, 2009, now Pat. No. 8,265,646.

(60) Provisional application No. 61/112,933, filed on Nov. 10, 2008.

(51) Int. Cl.
  *H04W 72/00* (2009.01)

(52) U.S. Cl.
  USPC ....... 455/450; 455/451; 455/452.1; 455/12.1; 455/427; 370/395.41

(58) Field of Classification Search ........ 455/3.03, 455/12.1, 12.2, 98, 427, 404.1, 404.2, 456.1, 455/422.1, 450–453, 456.2, 464, 509, 510, 455/3.02; 370/395.41, 332; 375/E7.141
  See application file for complete search history.

(56) References Cited

U.S. PATENT DOCUMENTS

| | | | |
|---|---|---|---|
| 5,216,427 A | | 6/1993 | Yan et al. |
| 5,519,404 A | * | 5/1996 | Cances et al. ............... 342/354 |
| 5,552,920 A | * | 9/1996 | Glynn ......................... 398/126 |
| 5,790,070 A | | 8/1998 | Natarajan et al. |
| 5,914,944 A | * | 6/1999 | Haugli et al. ............... 370/320 |

(Continued)

FOREIGN PATENT DOCUMENTS

| EP | 1089459 A2 | 4/2001 |
|---|---|---|
| WO | WO-99-49590 A1 | 9/1999 |

(Continued)

OTHER PUBLICATIONS

Non-final Office Action, U.S. Appl. No. 12/615,483, dated Feb. 2, 2012, 20 pgs.

(Continued)

*Primary Examiner* — Dominic E Rego
(74) *Attorney, Agent, or Firm* — Holland & Hart LLP

(57) ABSTRACT

Novel satellite communications systems, methods, and related devices are described. In one set of embodiments, available frequency channels may be dynamically assigned to particular beams of a multi-beam satellite system. The frequency assignment may be based on the amount of frequency allocated to particular beams of the multi-beam satellite system, utilizing a novel frequency selection method employing frequency reuse constraints. There may be a number of distinct frequency channels that are each assigned to one or more different beams. Such a system may be made up of a satellite in communication with terminals (e.g., user terminals or gateways). The satellite may receive and compile bandwidth request data from the terminals, and use this information in frequency assignment.

20 Claims, 10 Drawing Sheets

U.S. PATENT DOCUMENTS

| | | | |
|---|---|---|---|
| 5,963,862 A * | 10/1999 | Adiwoso et al. | 455/430 |
| 6,037,983 A | 3/2000 | Au et al. | |
| 6,038,594 A | 3/2000 | Puente et al. | |
| 6,055,431 A * | 4/2000 | Dybdal | 455/450 |
| 6,067,453 A * | 5/2000 | Adiwoso et al. | 455/430 |
| 6,091,936 A | 7/2000 | Chennakeshu et al. | |
| 6,574,794 B1 | 6/2003 | Sarraf | |
| 6,738,346 B1 | 5/2004 | Prieto, Jr. et al. | |
| 6,904,265 B1 * | 6/2005 | Valdivia et al. | 455/12.1 |
| 7,016,375 B1 | 3/2006 | Rosenberg et al. | |
| 7,027,414 B2 | 4/2006 | Walsh et al. | |
| 7,054,938 B2 * | 5/2006 | Sundqvist et al. | 709/227 |
| 7,130,283 B2 | 10/2006 | Vogel et al. | |
| 7,139,251 B1 | 11/2006 | Varma | |
| 7,366,134 B2 | 4/2008 | Bose et al. | |
| 7,382,743 B1 | 6/2008 | Rao et al. | |
| 7,729,244 B2 | 6/2010 | Sadr | |
| 7,751,320 B2 | 7/2010 | Nuzman et al. | |
| 7,936,707 B2 | 5/2011 | Kota et al. | |
| 7,945,269 B2 | 5/2011 | Drakos | |
| 8,085,802 B1 | 12/2011 | Monk et al. | |
| 8,311,006 B2 | 11/2012 | Agarwal | |
| 8,325,664 B2 | 12/2012 | Agarwal | |
| 8,351,383 B2 | 1/2013 | Agarwal | |
| 2001/0022789 A1 | 9/2001 | Huang et al. | |
| 2001/0049284 A1 | 12/2001 | Liu et al. | |
| 2002/0027896 A1 | 3/2002 | Hughes et al. | |
| 2002/0054576 A1 | 5/2002 | Gobbi | |
| 2002/0159403 A1 | 10/2002 | Reddy | |
| 2002/0176398 A1 | 11/2002 | Nidda | |
| 2003/0031141 A1 | 2/2003 | Schweinhart et al. | |
| 2003/0032427 A1 * | 2/2003 | Walsh et al. | 455/428 |
| 2003/0035385 A1 | 2/2003 | Walsh et al. | |
| 2003/0069043 A1 * | 4/2003 | Chhaochharia et al. | 455/561 |
| 2004/0100941 A1 | 5/2004 | Lim | |
| 2004/0132448 A1 * | 7/2004 | Torres et al. | 455/427 |
| 2004/0192376 A1 | 9/2004 | Grybos | |
| 2004/0219923 A1 | 11/2004 | Oses et al. | |
| 2005/0037764 A1 | 2/2005 | Trachtman | |
| 2005/0053033 A1 | 3/2005 | Kelly et al. | |
| 2005/0227618 A1 * | 10/2005 | Karabinis et al. | 455/13.3 |
| 2006/0171390 A1 * | 8/2006 | La Joie | 370/390 |
| 2007/0153690 A1 | 7/2007 | Stanwood et al. | |
| 2007/0155316 A1 * | 7/2007 | Monte et al. | 455/12.1 |
| 2007/0195817 A1 * | 8/2007 | Denney et al. | 370/468 |
| 2008/0001812 A1 | 1/2008 | Jalali | |
| 2008/0062028 A1 | 3/2008 | Chang | |
| 2008/0080451 A1 | 4/2008 | Rofougaran | |
| 2008/0146145 A1 | 6/2008 | Pateros et al. | |
| 2008/0219266 A1 | 9/2008 | Agarwal | |
| 2008/0233865 A1 | 9/2008 | Malarky et al. | |
| 2008/0320540 A1 | 12/2008 | Brooks et al. | |
| 2009/0109895 A1 | 4/2009 | Kota et al. | |
| 2009/0191810 A1 * | 7/2009 | Sogabe et al. | 455/12.1 |
| 2010/0034107 A1 | 2/2010 | Chin et al. | |
| 2010/0118764 A1 | 5/2010 | Agarwal | |
| 2010/0118765 A1 | 5/2010 | Agarwal | |
| 2010/0118766 A1 | 5/2010 | Agarwal | |
| 2010/0118767 A1 | 5/2010 | Agarwal | |
| 2010/0118769 A1 | 5/2010 | Agarwal | |
| 2010/0120357 A1 | 5/2010 | Agarwal | |
| 2010/0120359 A1 | 5/2010 | Agarwal | |
| 2010/0120418 A1 | 5/2010 | Agarwal | |
| 2010/0183306 A1 * | 7/2010 | Pangrac et al. | 398/72 |
| 2010/0238869 A1 | 9/2010 | Bruin et al. | |
| 2010/0255776 A1 | 10/2010 | Hudson et al. | |
| 2010/0315949 A1 | 12/2010 | Agarwal | |
| 2011/0034166 A1 | 2/2011 | Karabinis et al. | |

FOREIGN PATENT DOCUMENTS

| | | |
|---|---|---|
| WO | WO-2004-073229 A2 | 8/2004 |
| WO | WO-2008-100341 A2 | 8/2008 |
| WO | WO-2008-109860 A2 | 9/2008 |

OTHER PUBLICATIONS

Notice of Allowance, U.S. Appl. No. 12/615,483, dated May 25, 2012, 10 pgs.

International Preliminary Report on Patentability, Int'l App. No. PCT/US2009/063919, dated May 19, 2011, 6 pgs.

International Search Report and Written Opinion, Int'l App. No. PCT/US2009/063919, dated Jun. 22, 2010, 8 pgs.

Non-final Office Action, U.S. Appl. No. 12/615,709, dated Mar. 14, 2012, 21 pgs.

Non-final Office Action, U.S. Appl. No. 12/615,720, dated Mar. 13, 2012, 22 pgs.

Non-final Office Action, U.S. Appl. No. 12/615,735, dated Mar. 1, 2012, 20 pgs.

Notice of Allowance, U.S. Appl. No. 12/615,735, dated Jul. 9, 2012, 14 pgs.

International Preliminary Report on Patentability, Int'l App. No. PCT/US2009/063917, dated May 19, 2011, 8 pgs.

International Search Report and Written Opinion, Int'l App. No. PCT/US2009/063917, dated Jun. 24, 2010, 9 pgs.

Non-final Office Action, U.S. Appl. No. 12/615,488, dated Feb. 28, 2012, 19 pgs.

Non-final Office Action, U.S. Appl. No. 12/615,488, dated Aug. 2, 2012, 21 pgs.

Non-final Office Action, U.S. Appl. No. 12/615,491, dated Feb. 27, 2012, 30 pgs.

Notice of Allowance, U.S. Appl. No. 12/615,499, dated Jan. 27, 2012, 15 pgs.

International Preliminary Report on Patentability, Int'l App. No. PCT/US2009/063914, dated May 19, 2011, 11 pgs.

International Search Report and Written Opinion, Int'l App. No. PCT/US2009/063914, dated Jun. 28, 2010, 12 pgs.

International Preliminary Report on Patentability, Int'l App. No. PCT/US2010/038721, dated Dec. 29, 2011, 8 pgs.

International Search Report and Written Opinion, Int'l App. No. PCT/US2010/038721, dated Oct. 19, 2010, 9 pgs.

Notice of Allowance dated Jan. 3, 2013, U.S. Appl. No. 12/615,488, 10 pgs.

Supplemental Notice of Allowance dated Dec. 3, 2012, U.S. Appl. No. 12/615,491, 9 pgs.

Notice of Allowance dated Dec. 28, 2012, U.S. Appl. No. 12/615,512, 9 pgs.

Restriction Requirement dated Nov. 6, 2012, U.S. Appl. No. 12/815,894, 9 pgs.

Notice of Allowance dated Oct. 26, 2012, U.S. Appl. No. 12/615,709, 15 pgs.

Notice of Allowance dated Oct. 12, 2012, U.S. Appl. No. 12/615,720, 15 pgs.

Notice of Allowance dated Sep. 28, 2012, U.S. Appl. No. 12/615,491, 15 pgs.

Notice of Allowance dated Oct. 15, 2012, U.S. Appl. No. 12/615,499, 12 pgs.

Non-final Office Action dated Aug. 22, 2012, U.S. Appl. No. 12/615,512, 24 pgs.

Non-final Office Action dated Feb. 15, 2013, U.S. Appl. No. 12/815,894, 57 pgs.

Sbarounis et al., "Dynamic Bandwidth and Resource Allocation (DBRA) for MILSATCOM", 2004, IEEE Military Communications Conference, 7pgs.

* cited by examiner

| Terminal Id (305) | Terminal Priority (310) | Mode (315) | Class (320) | Min SR (325) | CIR (330) | RIR (335) |
|---|---|---|---|---|---|---|
| 1 | 3 | Burst Size, Modulation | 0 | 32 | 100 | 50 |
| | | | 1 | 64 | 0 | 200 |
| | | | 2 | 0 | 100 | 100 |
| | | | 3 | 0 | 200 | 200 |

DYNAMIC FREQUENCY ASSIGNMENT IN A MULTI-BEAM SYSTEM

CROSS-REFERENCES TO RELATED APPLICATIONS

This application is a continuation of co-pending U.S. patent application Ser. No. 12/615,483, filed Nov. 10, 2009, entitled "DYNAMIC FREQUENCY ASSIGNMENT IN A MULTI-BEAM SYSTEM", which claims priority from U.S. Provisional Patent Application No. 61/112,933, filed Nov. 10, 2008, entitled "DYNAMIC FREQUENCY ASSIGNMENT IN A MULTI-BEAM SYSTEM", each of which is hereby expressly incorporated by reference, as if set forth in full in this document, for all purposes.

This application is related to the following U.S. Patent Applications:
application Ser. No. 12/615,488, filed Nov. 10, 2009, entitled "BANDWIDTH ALLOCATION ACROSS BEAMS IN A MULTI-BEAM SYSTEM";
application Ser. No. 12/615,491, filed Nov. 10, 2009, entitled "CARRIER GROUP APPORTIONMENT FOR A SATELLITE COMMUNICATIONS SYSTEM";
application Ser. No. 12/615,499, filed Nov. 10, 2009, entitled "APPORTIONED CARRIER GROUP SLOT PLACEMENT FOR A SATELLITE COMMUNICATIONS SYSTEM";
application Ser. No. 12/615,512, filed Nov. 10, 2009, entitled "TERMINAL MODE ASSIGNMENT FOR A SATELLITE COMMUNICATIONS SYSTEM";
application Ser. No. 12/615,709, filed Nov. 10, 2009, entitled "TRAFFIC CLASS POOL SIZING FOR A SATELLITE COMMUNICATIONS SYSTEM";
application Ser. No. 12/615,720, filed Nov. 10, 2009, entitled "TERMINAL SLOT ASSIGNMENT FOR A SATELLITE COMMUNICATIONS SYSTEM"; and
application Ser. No. 12/615,735, filed Nov. 10, 2009, entitled "RESOURCE FAIRNESS POLICIES FOR ALLOCATION OF RESOURCES IN A SATELLITE COMMUNICATIONS SYSTEM"; and
application Ser. No. 12/815,894, filed Jun. 15, 2010, entitled "DYNAMIC BANDWIDTH RESOURCE ALLOCATION FOR SATELLITE DOWNLINKS".

BACKGROUND

The present invention relates to satellite communications in general and, in particular, to dynamic frequency assignment.

Satellite communications systems often have a limited amount of available bandwidth to be allocated to terminals. In many multi-beam system designs, certain frequency channels are allocated to each beam with a static allocation. However, the resource needs for the terminals within each beam may change over time, and thus the particular number of frequency channels which should be allocated to beams can vary over time. When there is a finite amount of available spectrum, static frequency assignment in a multi-beam system may not be sufficient to allow re-allocation of bandwidth.

It may, therefore, be desirable to utilize a system design in which particular frequency channels are assigned to beams dynamically, in response to requests from terminals.

BRIEF SUMMARY OF THE INVENTION

Novel satellite communications systems, methods, and related devices are described. In one set of embodiments, available frequency channels may be dynamically assigned to particular beams of a multi-beam satellite system. The frequency assignment may be based on an amount of frequency allocated to particular beams of the system, utilizing a novel frequency selection method employing frequency reuse constraints. There may be a number of distinct frequency channels that are each assigned to one or more different beams. Such a system may be made up of a satellite in communication with terminals (e.g., user terminals or gateways). The satellite may receive and compile bandwidth request data from the terminals, and use this information in frequency assignment.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 is a diagram of a table making up a bandwidth request from a terminal according to various embodiments of the invention.

DETAILED DESCRIPTION OF THE INVENTION

Novel satellite communications systems, methods, and related devices are described. In one set of embodiments, available frequency channels may be dynamically assigned to particular beams of a multi-beam satellite system. The frequency assignment may be based on the amount of frequency allocated to particular beams of the system, utilizing a novel frequency selection method employing frequency reuse constraints. A network control center (NCC), the satellite, or a combination thereof may be configured to perform the frequency assignment functionality described herein.

The following description provides examples only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, devices, and software may individually or collectively be components of a larger system, wherein other procedures may take precedence over or otherwise modify their application. Also, a number of steps may be required before, after, or concurrently with the following embodiments.

Figure 1:
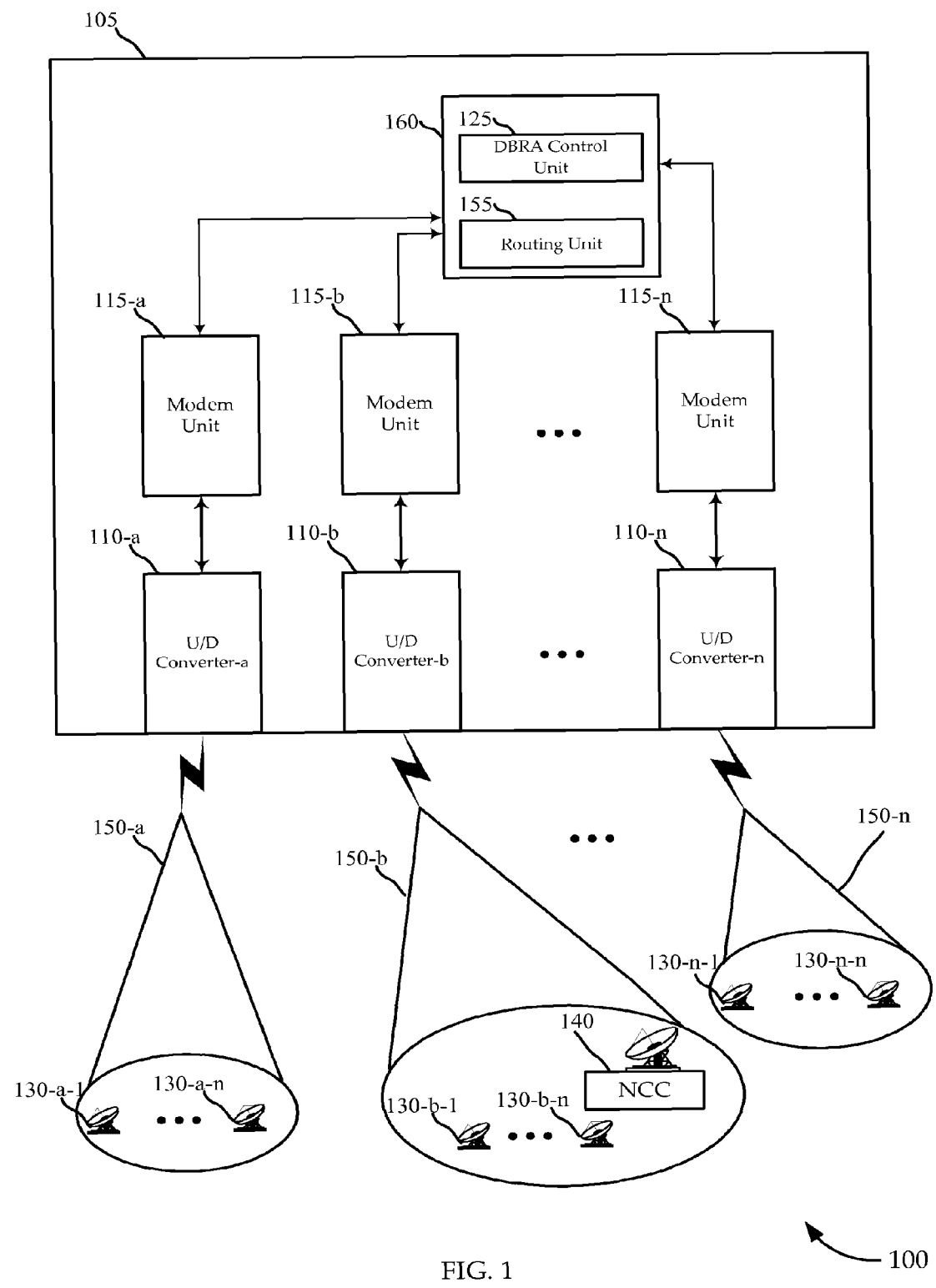
FIG. 1 is a block diagram of a satellite communications system configured according to various embodiments of the invention.

Systems, devices, methods, and software are described for a satellite communications system, wherein the system is configured to include novel frequency assignment functionality. FIG. 1 is a high level block diagram illustrating a satellite communications system 100 according to various embodiments of the invention. The system includes a satellite 105 in communication with terminals 130 (e.g., user terminals or gateways), a network control center (NCC) 140, and possibly one or more other satellites (not shown). The satellite 105 in the illustrated embodiment includes three or more beams 150-a, 150-b . . . 150-n, each beam 150 including a coverage area. Respective U/D converters 110 may receive signals transmitted via the terminals 130, and transmit signals to terminals 130, in their beam coverage area, as shown in FIG. 1. The U/D converters 110 for each beam may be configurable to receive different frequency ranges, and may be dynamically configured to serve different beams (e.g., all or part of one or more beams). U/D converters 110 are in communication with modem units 115, which may provide a range of modulator and demodulator functionality described in more detail below. The modem units 115 are in communication with a control unit 160 (including DBRA control unit 125 and routing unit 155), which may manage and allocate system and satellite 105 resources.

Each beam 150 supports the terminals 130 within its coverage area (e.g., providing uplink and downlink resources). Each beam 150 may be assigned one, or more, ranges of frequencies (which may be referred to as channels). The coverage of different beams 150 may be non-overlapping or have varying measures of overlap. A portion of spectrum may also be allocated for use to communicate with another satellite (not shown) via an inter-satellite link (ISL). The satellite 105 may provide connectivity between terminals 130 in the same beam and across beams (via star or mesh connections), as well as to and from beams of other satellites via ISLs. Thus, for terminals 130 served by the same satellite 105, there may be full-mesh, single-hop connectivity between terminals, or they may communicate via the NCC 140. For terminals 130 served by different satellites, there may be full-mesh, two-satellite-hop connectivity between terminals, or various star configurations may be employed.

In one embodiment, the DBRA control unit 125 onboard satellite 105 manages bandwidth resources (e.g., ranges of frequencies, and time slots therein) and assigns them to coverage beams 150 and terminals 130. These allocations may be for a downlink or uplink. To accomplish these allocations, the DBRA control unit 125 dynamically manages both bandwidth resources and satellite 105 resources (e.g., routing and switching functionality, U/D converter frequencies, demodulators, modulators, buffers, etc.). DBRA resource management decisions may be driven by terminals 130, as the DBRA control unit 125 may receive terminal 130 resource requests and link characteristics, and assign frequencies and slots to terminals 130 dynamically based on service level agreements (SLAs), terminal priority, and frequency reuse constraints, for example. In other embodiments, one or more of the DBRA control unit 125 functions described herein may be performed by the NCC 140 (acting as a hub or gateway).

Terminals 130 may be mobile or fixed, and thus may log on to different beams 150 depending on location and may move from beam to beam. Terminals 130 (which may include the NCC 140) may request particular amounts of uplink or downlink bandwidth for different traffic types, and may consume varying amounts of uplink or downlink resources for different types of traffic. The DBRA control unit 125 may be configured to allocate the appropriate amount of resources at the right mode to each terminal. In some embodiments, terminal 130 SLAs provide information about how much traffic of a given traffic class is guaranteed to a terminal (CIR). Multi-level CIR may be used to provide the capability to break up the CIR into multiple levels, in increasing order of priority.

In one embodiment, the satellite 105 includes a separate modem unit 115 for each beam, and the modem units 115 may be managed by the DBRA control unit 125. Each modem unit 115 may receive a signal (e.g., an IF signal) from, or output a signal to, an associated U/D converter 110. Each modem unit 115 may provide some or all of the physical, link, and MAC layer functions for signals received from terminals 130. In another embodiment, a single integrated modem device may support two or more of the beams by housing two or more logical modem units 115. Other modem configurations may be used as well, as evident to those skilled in the art. A variety of functions may be performed by the modems units 115, such as a) modulation, coding, framing, time-division multiple access (TDMA); b) dynamic/adaptive/variable modulation/coding; c) frequency and/or power management; d) master, or secondary, reference terminal functions, including acquisition and synchronization support and link quality measurements (e.g., measuring frequency, timing, or power of one or more received signals); c) packet segmentation and reassembly; f) dynamic TDMA bandwidth request; g) packet queuing, scheduling, and queue management; and h) internet protocol (IP) packet routing and forwarding. In other embodiments, one or more of these functions may be performed by the NCC 140.

The routing unit 155, in communication with each of the modem units 115, may provide the layer 3 functionality or other routing functionality (instead of the modem units 115), including IP packet routing across multiple beams/transponders. The routing unit 155 (or the modem units 115) may perform a variety of routing functions including: a) IP routing for various protocols (RIP, BGP, OSPF, PIM) and multicast replication; b) traffic conditioning, policing, and access control; and c) RSVP/ARSVP.

The NCC 140 may also provide network management services for the modems 115 and the terminals 130. The NCC 140 may include the following functions: a) IP modem management (provisioning, configuration, software/firmware downloads to terminals, status and performance management); b) system broadcast messages; c) terminal acquisition and synchronization support; d) adaptive terminal frequency, timing, and power management support and correction; e) dynamic bandwidth/resource allocation; and f) interface with network management and router management.

Therefore, uplink and downlink bandwidth may be dynamically assigned to terminals 130 by the DBRA control unit 125 onboard satellite 105, the NCC 140, or any combination thereof. Terminals 130 may measure traffic flows and estimate uplink and downlink bandwidth requirements, and may send bandwidth requests periodically to the DBRA control unit 125, or to the NCC 140 (via satellite 105 or otherwise). In the alternative, bandwidth needs may be estimated. Specific time slots in specific carriers may be allocated to individual terminals 130 based on requests and/or estimates.

System 100 parameters may be configurable using the NCC 140 and can be optimized even after the system is operational. Examples of such parameters include carrier sizing, spacing and number of carriers, number of bursts for control and management traffic, guard times between bursts, and rules for bandwidth allocation. In one embodiment, an off-path link is made available for managing modem units 115 and the DBRA control unit 125 (e.g., in case the on-path link becomes unavailable due to a software and/or hardware failure). This off-path link may be a slow access link. Thus, the NCC 140 may be configured to control, manage, and monitor the links of the system 100. The NCC 140 may monitor and control links in beams other than its own. The NCC 140, therefore, may perform near real-time capacity and dynamic bandwidth management in addition to configuration, accounting, performance, and security/authentication functions. The NCC 140 may host a web server to provide access to browser clients.

As noted above, although the communications system 100 is illustrated as a geostationary satellite-based communication system, it should be noted that various embodiments described herein are not limited to use in geostationary satellite-based systems, for example some embodiments could be low earth orbit (LEO) satellite-based systems. The terminals 130 may include, for example, gateways or user terminals (sometimes called user terminals). The system 100 may be a star, mesh, or hybrid, and may be implemented in an existing star, mesh, or hybrid system.

One or more computing devices may be connected locally (e.g., a LAN, with wired or wireless connectivity) with a terminal 130, and a connected terminal may be connected to a wider network, as well. Data and information, such as IP datagrams, may be sent from such a connected device through a terminal 130 and the satellite 105, and to another terminal 130 (or other satellite 105). A variety of physical layer transmission modulation and coding techniques may be used on links between the satellite 105 and terminal 130 (or other satellite 105), including those defined with the DVB-S2 and WiMAX standards. Different multiplexing schemes may be used as well, including Multi-Frequency Time-Division Multiple Access (MF-TDMA), TDMA, Frequency Division Multiple Access (FDMA), Orthogonal Frequency Division Multiple Access (OFDMA), Code Division Multiple Access (CDMA), or any number of hybrid or other schemes known in the art. In various embodiments, the physical layer techniques may be the same, or different, for downstream and upstream links between the satellite 105 and terminal 130 (or other satellite). In one embodiment, the system 100 will support binary phase shift keying (BPSK) and quadrature phase shift keying (QPSK) modulations and Viterbi and Reed-Solomon forward error correction (FEC). The system may additionally support 8-PSK and 16 QAM, and LDPC and Turbo code FEC.

In one embodiment, the uplink is in a multi-frequency time-division multiple access (MF-TDMA) format. The uplink spectrum is configured as N carriers, which may include different or configurable different symbol rates and frequency channel sizes. Each frequency channel is divided in time into fixed period frames, and each frame contains a number of variable sized time slots, or bursts. In general, each frequency channel is assigned to one or more beams. Each time slot may use a specific modulation and FEC coding rate, and contain one or more packet segments. User IP packets may be fragmented into packet segments and reassembled at the modem unit 115 before IP processing. Certain bursts are used for network control packets for terminal acquisition, terminal synchronization maintenance, and bandwidth requests. In one embodiment, the burst structures used may be the same as those used in existing mesh architectures.

A terminal 130 may use an antenna to transmit a signal to the satellite 105. In one embodiment, the antenna is a parabolic reflector with high directivity in the direction of the satellite and low directivity in other directions. The antenna may have a variety of alternative configurations and include operating features such as high isolation between orthogonal polarizations, high efficiency in the operational frequency bands, and low noise. Terminals with small antenna/HPA sizes and limited power may be accommodated by configuring a few small sized carriers (e.g., 384 or 512 ksps) on the uplink.

Terminals 130 may include existing, modified, and specifically configured terminals. Terminals 130 may include a small indoor unit (IDU) and an appropriately sized antenna and RF equipment (the outdoor unit ODU). The IDU may have a 10/100baseT Ethernet/IP interface as the user traffic interface. The IDU may provide IP router functionality to the user network. In one embodiment, terminals 130 are managed through the satellite 105 by the NCC 140. The NCC 140 may, therefore, be configured to allocate uplink and downlink bandwidth on carriers for these terminals, and send routing information to the terminals 130.

The satellite 105 may, for example, use a reflector antenna, lens antenna, array antenna, active antenna, or other mechanism known in the art for reception of such signals. The satellite 105 may process the signals received from a terminal 130, and then route and transmit the processed signal down to another terminal 130 (which may be within the same, or different, beam, or may be served via another satellite 105 via an ISL). In one embodiment, the satellite 105 operates in a multi-beam mode, transmitting a number of narrow beams each directed at a different region of the earth, allowing for frequency re-use.

Figure 2:
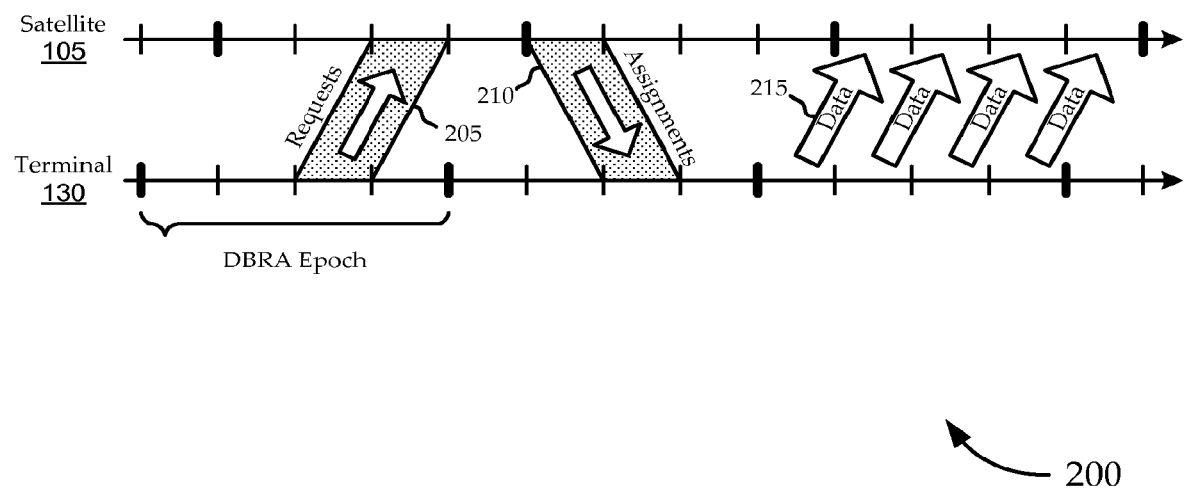
FIG. 2 is a diagram of a bandwidth request from, and a frequency assignment to, a terminal according to various embodiments of the invention.

FIG. 2 is a diagram 200 illustrating an example of how terminals 130 may request bandwidth and the satellite 105 may allocate slots, in a system such as the system of FIG. 1. Terminals 130 in each beam may transmit requests 205 to the satellite 105. These requests may be based on any combination of past and estimated future bandwidth needs, and may, for example, be sent every epoch, every n epochs, or whenever bandwidth needs change in excess of a threshold. Based on these requests, the satellite 105 may assign frequency channels to particular beams. Moreover, the satellite 105 may allocate slot assignments 210 to terminals 130 from the bandwidth allocated to particular beams. Terminals 130 may then transmit data 215 on the uplink. It is worth noting that while in this embodiment the satellite 105 performs this allocation and assignments; in other embodiments, all or part of this functionality may be performed by an NCC 140 (e.g., the satellite 105 may forward the requests to the NCC 140, and receive frequency channel assignments from the NCC 140 for forwarding to the terminals 130).

FIG. 3 is a diagram that illustrates a table 300 of information that may be sent from a terminal 130 to a satellite 105 (or NCC 140). This may be the information in the bandwidth request message 205 of FIG. 2. All, or any subset, of the following information may be transmitted from a terminal 130 to request bandwidth. For example, a terminal may send a terminal ID 305 (MAC Address, IP Address, other unique identifier or account number for the terminal), a terminal priority 310 (which provides information on the priority of the terminal relative to other terminals), and a mode 315 (which may provide information on a requested modulation scheme, coding, a requested carrier group, or amount of bandwidth). A terminal may also transmit specific requests for each of a number of classes 320 of traffic (e.g., voice, interactive data, interactive video, streaming video, or other types of data with different quality of service metrics). For each traffic class (or for a number of traffic classes), a minimum sustained rate 325 (Min SR), a committed information rate 330 (CIR), and requested information rate 335 (RIR) may each be transmitted. There may also be sub-types of traffic within a class.

It is worth noting, moreover, that the bandwidth requests may instead be forwarded via the satellite 105 to one or more ground terminals (e.g., NCC 140). The satellite 105, the NCC 140, or any combination thereof may perform the frequency assignment functionality. It is also worth noting that the bandwidth request data may be made up of specific MinSR 325, CIR 330, and RIR 335 data, or may be in different forms. For example, the bandwidth request messages may instead reflect past data traffic in one or more of the categories. In different embodiments, there may be other formulations reflecting various quality of service or traffic class metrics, and include various types of past traffic or estimated future traffic information.

Figure 4:
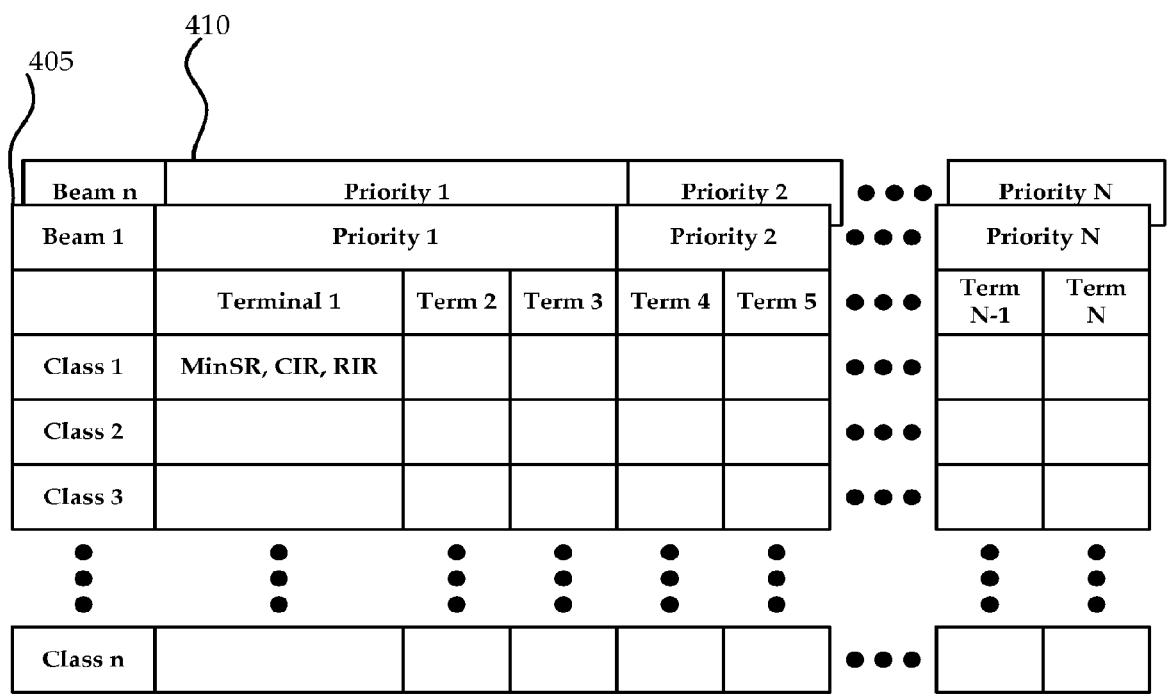
FIG. 4 is a diagram of a table of per-beam requests according to various embodiments of the invention.

Turning next to FIG. 4, a diagram is shown that illustrates tables 400 of information that may be stored on the satellite 105 (or NCC 140). These tables may be based, for example, on the information sent in bandwidth requests 205 from a terminal 130 to a satellite 105 (or NCC 140). In one embodiment, the bandwidth requests from the terminals within each beam are separated into different tables 405, 410 for each beam. The MinSR, CIR, and RIR for each terminal are identified in groups according to terminal priority (e.g., from highest priority to lowest priority). In one embodiment, the MinSR, CIR, and MR are further divided for each traffic class. The MinSR, CIR, and MR values may be specified in bits/second, Kbits/second, or other metric; they may also be converted to a measure of normalized time-slots/epoch. The conversion may be of the terminal mode (e.g., channel size, modulation, and coding). Those skilled in the art will recognize the various ways in which the MinSR, CIR, and RIR values bit rates may be normalized into time slots to ease calculations. The per-beam tables 405, 410 may be based in whole, or only in part, on requests, and may be separated into uplink and downlink components.

Figure 5:
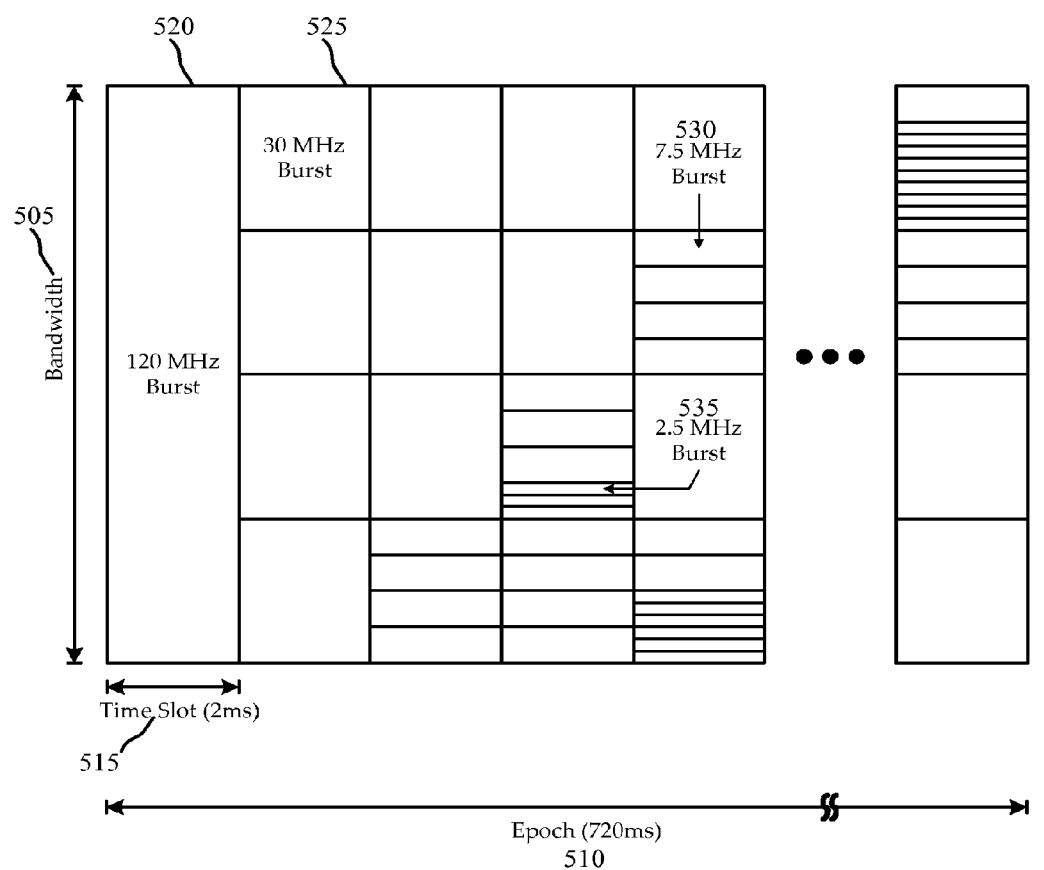
FIG. 5 is a diagram of frequency channel sizing according to various embodiments of the invention.

As noted above, there may be n bands (channels) to be allocated among a set of uplink and/or beams. FIG. 5 is a diagram 500 illustrating how one such channel may be structured. In this embodiment, there is a 120 MHz channel 505, and portions of this channel may be allocated to terminals in each epoch 510 (in this embodiment, 640 ms). In one embodiment, multiple beams may be mapped to a single channel (e.g., according to a 3-color, 4-color, or n-color reuse pattern); alternatively, a beam may also be mapped to a subset of time slots 515 for a channel in an epoch 510. A channel may be divided up into sub-channels, which in the illustrated embodiment may be 120 MHz 520, 30 MHz 525, 7.5 MHz 530, and 2.5 MHz 535; in other embodiments, there may be different channel or sub-channel sizes. Each epoch 510 may be split into different time slotss 515, or bursts; in one embodiment, the time slots 515 are 2 ms each. For a given system, the satellite 105 may be allocated a limited amount of bandwidth 505, and thus particular channels (or time slots therein) may be allocated to certain beams, and the time slots within channels may be allocated to terminals.

A determination may initially be made regarding the total amount of frequency (or bandwidth) that is available to be allocated. There may be any number of ways to identify a total amount of capacity that is to be allocated over a period of time. The total capacity may be limited by the frequency spectrum available for use on the uplink and/or downlink, or the demodulators on the satellite, or a number of other factors. There may be a margin used in identifying the bandwidth available, as well. Then, each beam (e.g., beam 150 of FIG. 1) may be allocated a portion of the available frequency for use. The allocation across beams may be performed dynamically, or may be static at certain times or periods of the day, and may be performed by the NCC 140 or DBRA control unit 125 of FIG. 1. There may be an uplink allocation, and a downlink allocation.

Once a portion of the available frequency has been allocated to each beam (on the uplink and/or downlink), particular ranges of frequencies (referred to above as channels) may be allocated to particular beams. The uplink and/or downlink channels (ranges of frequencies) may be assigned to particular beams every n epochs. The frequency allocation may be static, or updated regularly, in different embodiments; the frequency assignment may be performed at varying intervals depending on how often the frequency allocation occurs. In some embodiments, the frequency assignments may be made less often than the frequency allocation. For example, the frequency allocation among beams may be relatively stable for a number of sets of epochs, and thus the frequency assignment could be suspended until there is a change in the frequency allocation that exceeds a threshold.

In some embodiments, there are eight 100 MHz channels to be allocated to beams. In one embodiment, the channels are allocated to beams using a 3-color reuse pattern constraint; in another embodiment, the channels are allocated to beams using a 4-color reuse pattern constraint. In still other embodiments, there may be more channels, and other reuse patterns (e.g., 16 40 MHz channels, with 7-color reuse). In still other embodiments, there may be channels of different sizes (e.g., eight 40 MHz channels and four 80 MHz channels). Regardless, the frequencies are, in some embodiments, assigned dynamically every n epochs in response the bandwidth allocated to each beam.

Figure 6:
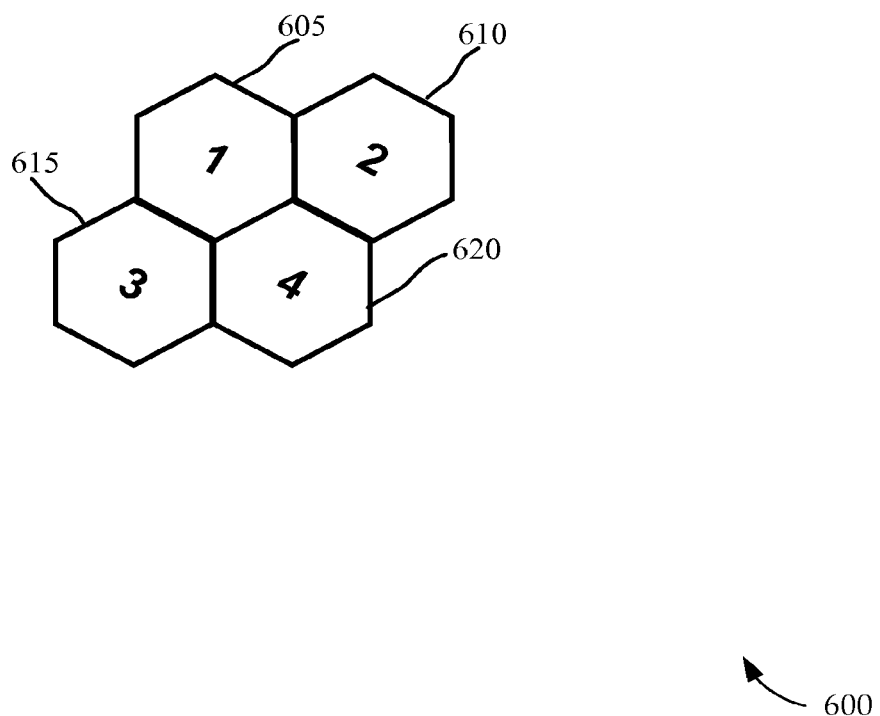
FIG. 6 is a diagram of a beam layout in a satellite system according to various embodiments of the invention.

An example of a beam layout and a frequency reuse constraint will now be disclosed using FIG. 6. This may, for example, be a layout in the system 100 of FIG. 1. The frequency assignment may be performed by the NCC 140 or DBRA control unit 125, or any combination thereof. FIG. 6 illustrates an example beam layout 600 for a four-beam system. Beam 1 605 is adjacent to beam 2 610, beam 3 615, and beam 4 620; beam 4 620 is similarly adjacent to the other three beams. Beam 2 610 is adjacent to beam 1 605 and beam 4 620, and not beam 3 615. Beam 3 615 is adjacent to beam 1 605 and beam 4 620, and not beam 2 610. Using a 3-color reuse scheme, the NCC 140 or DBRA control unit 125 may assign the same frequency channel during the same time period to beam 2 610 and beam 4 620. However, the NCC 140 or DBRA control unit 125 may not assign the same frequency channel during the same time period to beam 1 605 and any of the other beams 610, 615, or 620; nor may the same frequency channel be assigned during the same time period to beam 4 620 and any of the other beams 605, 610, or 615. As the number of beams and the number of frequency channels increase, the problem of frequency assignment becomes more complex. The following description sets forth various selection progression and prioritization schemes to address such issues.

Figure 7:
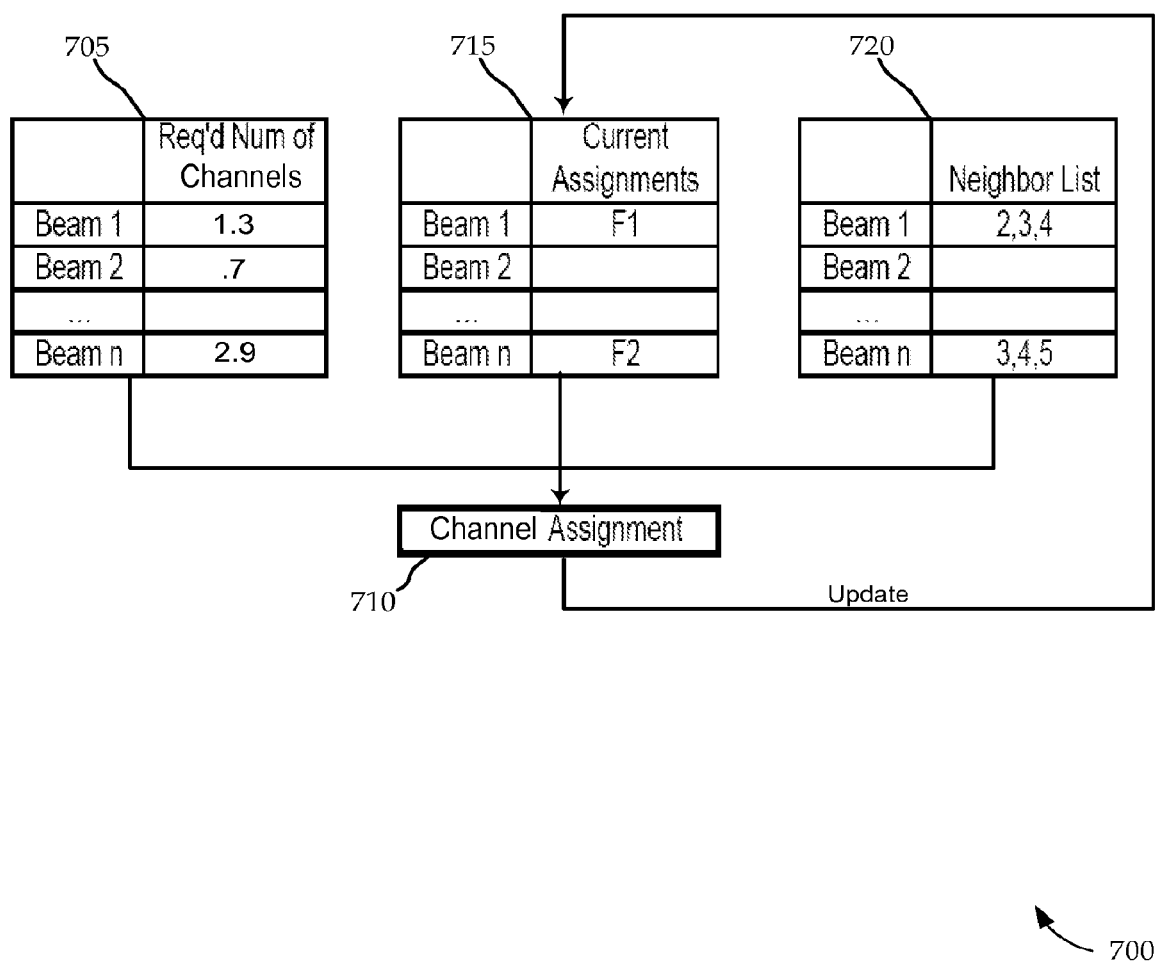
FIG. 7 is a diagram of a set of tables that may be used to assign frequency channels to beams according to various embodiments of the invention.

Turning to FIG. 7, a block diagram 700 illustrates a set of tables that may be used to assign frequencies to beams. The table and decisions illustrated in diagram 700 may, for example, be performed by the NCC 140 or DBRA control unit 125 of FIG. 1, or any combination thereof. In the illustrated embodiment, assume that there are eight 80 MHz channels to be allocated to beams, and the channels are allocated to beams using a 4-color reuse pattern. It is worth noting at the outset that in other embodiments, there may be various frequency channel sizes, different numbers of channels, and different reuse patterns. Table 705 is a table illustrating an amount of frequency remaining to be allocated to each beam (expressed in the form of the number of channels remaining to allocate). This may be calculated based on the bandwidth or capacity allocated to each beam. In one embodiment, the required number of channels may be rounded up for each beam.

At decision block 710, frequency channels are assigned to particular beams. Table 715 reflects the current frequency channel assignments for each beam, reflecting the channel assignment from block 710. Table 720 reflects the neighbor beam list for each beam, indicating which beams are next to each other. Table 720 may be used to ensure that the same frequency is not assigned to neighbors for a same time period. This table 720 may be generated based on the beam layout, in light of the reuse constraint (e.g., 3-color, 4-color, or 7-color). Therefore, once a channel is assigned to a beam at block 710, table 715 may be updated to reflect the assignment.

In the illustrated embodiment, note that the channels are each the same size. With a straight 4-color reuse, this may result in some measure of wasted spectrum (e.g., because if beam 1 only needs 1.3 channels, it may nonetheless be assigned two channels for a straight 4-color reuse). Thus, in some embodiments, there may be channels of different sizes, or be smaller channels, to make better use of the spectrum. In one embodiment, time slots for a given channel may be divided among neighboring beams to use spectrum more efficiently.

Figure 8:
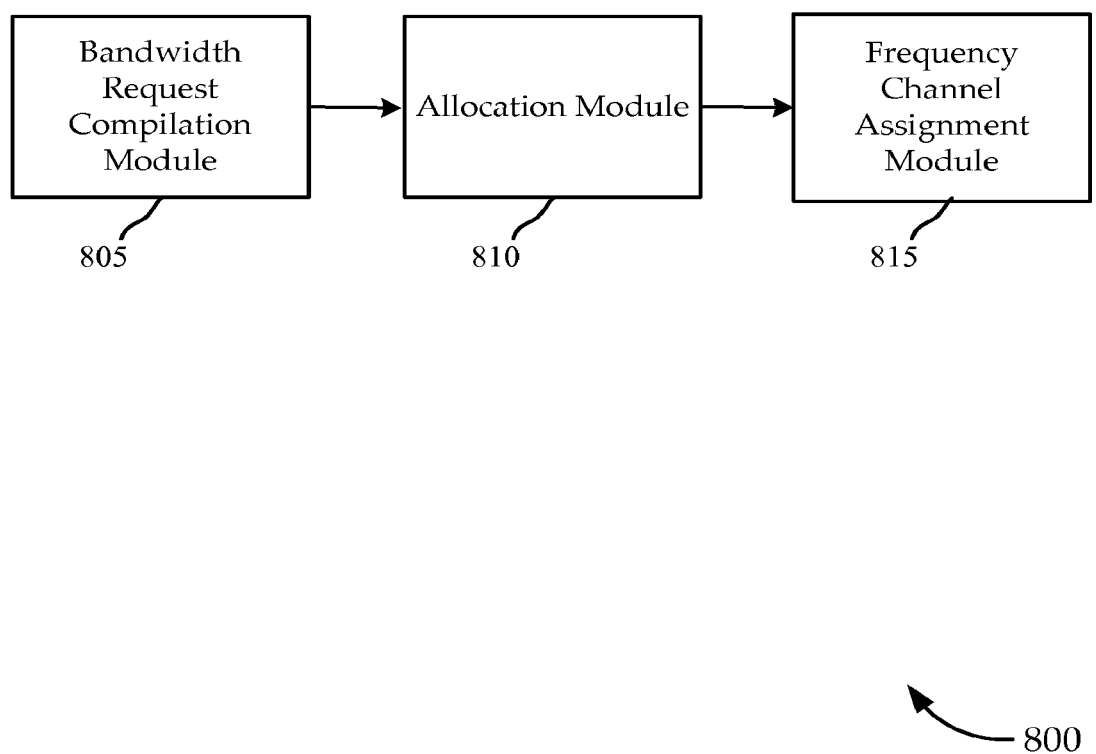
FIG. 8 is a block diagram of a configuration that may be used in a device or system to dynamically assign frequency channels to beams according to various embodiments of the invention.

Turning to FIG. 8, a block diagram is shown illustrating an example configuration 800 of a system for dynamically assigning frequency channels to beams in a satellite communications network. This configuration 800 may be implemented the system 100 of FIG. 1 or, more specifically, in the NCC 140 or DBRA control unit 125 of FIG. 1. However, some or all of the functionality of these modules may be implemented in other devices or sets of devices.

The system includes a bandwidth request compilation module 805, an allocation module 810, and a frequency channel assignment module 815, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The bandwidth request compilation module 805 may receive bandwidth requests from each of a number of terminals in the satellite communications system. The bandwidth requests may be the bandwidth request 205 of FIG. 2 or the bandwidth request 300 of FIG. 3. The bandwidth request compilation module 805 may then generate per-beam request data (e.g., in tables 405, 410 of FIG. 4) based at least in part on the received bandwidth requests. This per-beam request data may relate to an epoch, n epochs, or some other defined time duration. The per-beam request data may be based only on requests, or there may be predictive elements as well.

The configuration 800 also includes an allocation module 810, configured to identify an amount of a frequency allocation for each beam based at least in part on the per-beam bandwidth request data. The frequency channel assignment module 815 may then dynamically assign each of the frequency channels to one or more particular beams of the plurality of beams based at least in part on the amount of the frequency allocation to each beam and on frequency reuse constraints.

There are a number of different beam and channel selection order preferences that may be used. For example, the frequency channel assignment module 815 may provide an assignment order preference to beams with a fewest number of frequency channels assigned, or a smallest amount of frequency spectrum assigned. The frequency channel assignment module 815 may also provide an assignment order preference to a beam with a largest number of frequency channels remaining to be assigned according to the channels of frequency allocated to the beam. The frequency channel assignment module 815 may alternatively provide an assignment order preference to a beam with the greatest amount of frequency remaining to be assigned according to the amount frequency allocated to the beam. In other embodiments, the frequency channel assignment module 815 may provide an assignment order preference to a beam with a fewest number of frequency channels (or smallest amount of frequency) available for assignment according to the frequency reuse constraints.

In selecting a frequency for assignment for a particular beam identified for frequency assignment, a frequency channel may be selected that causes the fewest number of frequency channel choices to be deleted from neighboring beams according to the frequency reuse constraints. It follows that the frequency channel assignment module 815 may provide an assignment order preference to a beam with an available frequency channel causing a fewest number of frequency channel choices to be deleted from neighboring beams according to the frequency reuse constraints.

The configuration 800 may be implemented in a satellite 105, NCC 140, terminal 130, or any combination thereof. The selection process undertaken by the configuration 800 may be for a satellite uplink and/or satellite downlink.

Figure 9:
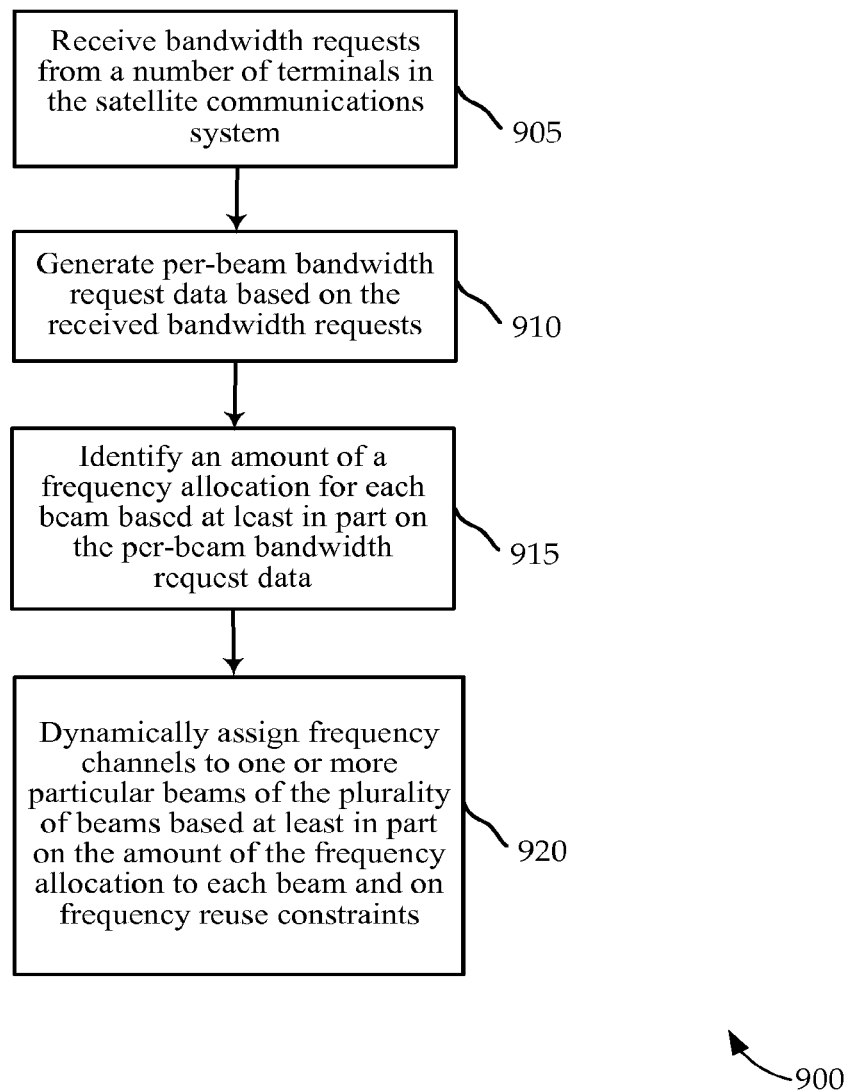
FIG. 9 is a flow chart illustrating the dynamic assignment of frequency channels to beams according to various embodiments of the invention.

FIG. 9 is a flowchart illustrating a method 900 of dynamically assigning frequency channels to beams. The method 900 may, for example, be performed by the NCC 140 or DBRA control unit 125 of FIG. 1, or any combination thereof. More specifically, the method 900 may be performed by the configuration 800 of FIG. 8.

At block 905, bandwidth requests are received from a number of terminals in the satellite communications system. At block 910, per-beam bandwidth request data is generated based on the received bandwidth requests. At block 915, an amount of a frequency allocation for each beam is identified based at least in part on the per-beam bandwidth request data. This may, for example, be expressed as a number of frequency channels remaining to be allocated. At block 920, frequency channels are dynamically assigned to one or more particular beams based at least in part on the amount of the frequency allocation to each beam and on frequency reuse constraints.

Figure 10:
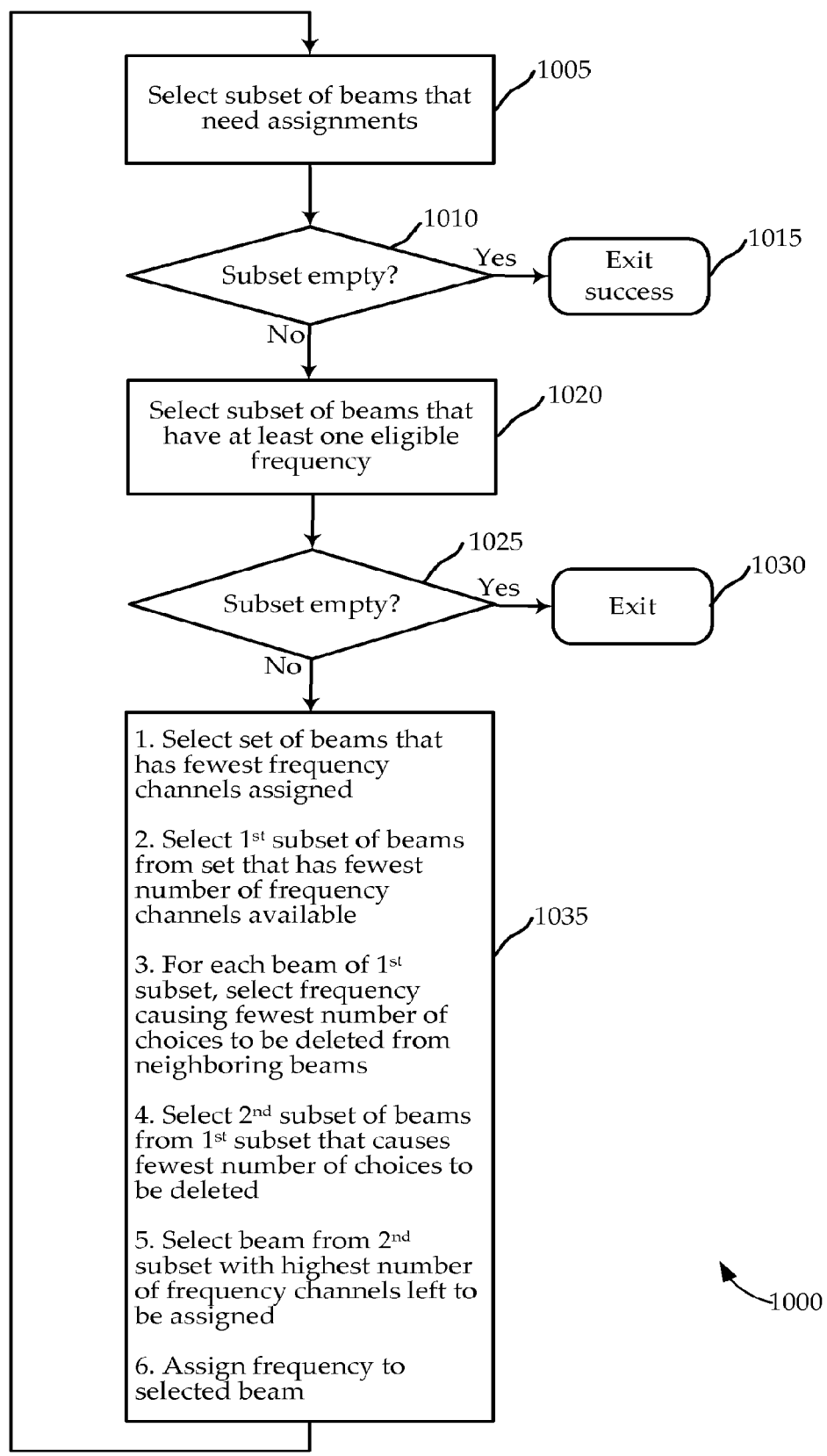
FIG. 10 is a flow chart illustrating a prioritization and selection process for the dynamic assignment of frequency channels to beams according to various embodiments of the invention.

FIG. 10 is a flowchart illustrating a method 1000 of dynamically assigning frequency channels to uplink beams (a similar process may be used for the downlink) The method 1000 may, for example, be performed by the NCC 140 or DBRA control unit 125 of FIG. 1, or any combination thereof. More specifically, the method 1000 may be performed by the configuration 800 of FIG. 8.

At block 1005, a determination is made identifying the subset of beams that needs assignments (e.g., by analyzing tables 705 and 715 of FIG. 7). At block 1010, a determination may be made whether all beams have sufficient frequency assignments. If so, the process may be completed successfully at block 1015. If not (i.e., one or more beams needs additional frequency channel assignments), at block 1020, the subset of beams needing frequency assignments that has at least one eligible range of frequencies (not assigned to a neighbor) is identified. At block 1025, a determination may be made whether that subset is empty. If so, at block 1030, the process is exited.

Thus, if uplink beams that need assignments have eligible frequencies, the following steps (or any subset thereof) may be undertaken at step 1035. At block 1035 (1.), a determination may be made identifying the set of beams that has the fewest number of frequency channels assigned (or, in other embodiments, the beams that have the smallest amount of frequency assigned may be identified). At block 1035 (2.), a first subset of beams from the identified set of beams is selected, the first subset made up of beams of the set that has the fewest channel choices available for possible assignment because of neighbor assignments (or, in other embodiments, the beams that have the smallest amount of frequency available may be identified). At block 1035 (3.), for each beam of the first subset identified in block 1035 (2.), the frequency channel that causes the fewest number of choices to be deleted from neighboring beams is identified. At block 1035 (4.), for each such beam and associated channel identified in block 1035 (3.), a second subset of beams which would cause the fewest number of choices to be deleted from neighboring beams is identified (or, in other embodiments, the second subset is identified as those beams that would cause the smallest amount of frequency to be deleted from neighboring beams). At block 1035 (5.), for each beam of the second subset identified in block 1035 (4.), the beam that has the highest number of frequency channels (or, e.g., the largest amount of frequency) left to be assigned is identified. At block 1035 (6.), the beam is assigned the identified frequency channel. Hence, block 1035 may assign a frequency to a beam, and then blocks 1005 through 1035 may be repeated until complete.

While the method 1000 of FIG. 10 identifies a series of steps, it is again worth emphasizing that method 1000 is only an example. The selection process may be modified in other embodiments. For example, the determinations regarding 1) identifying the subset of beams that has the fewest number of choices of channels available because of neighbor assignments, 2) identifying the particular channel that causes the fewest number of choices to be deleted from neighboring beams, and 3) identifying the beam or beams which would cause the fewest number of choices to be deleted from neighboring beams, may be ordered differently than described above. Additionally, there may be different steps added or deleted before, during, and after such determinations that are not discussed in detail herein. It is also worth noting that in one embodiment, if at any step the frequency assignment fails for a beam, the table 705 of FIG. 7 may be adjusted to presently assigned levels, and the beam may be pulled from additional consideration during the assignment period (e.g., n epochs).

A modem (e.g., modem unit 115, or portion thereof) may be assigned to a beam and programmed with the appropriate frequency information. For example, each modem may handle a full channel (e.g., 80 MHz) of bandwidth, or may handle more or less than one channel (i.e., a beam may be assigned more than one modem, or a modem may be shared among beams).

Any of the functionality described above with reference to the satellite 105, terminals 130, or NCC 140 of FIG. 1, or components thereof (e.g., a modem unit 115 or DBRA control unit 125), may be implemented in one or more Application Specific Integrated Circuits (ASICs), or in one or more general purpose processors adapted to perform the applicable functions. Alternatively, the functions of a satellite 105 may be performed by one or more other processing units (or cores) on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for dynamically assigning bandwidth resources to a plurality of beams in a satellite communications network, the system comprising:
    a request compilation module configured to:
        receive bandwidth resource requests from a first plurality of terminals in the satellite communications network, the first plurality of terminals located within a first geographical region serviced by a first beam of the plurality of beams;
        receive resource requests from a second plurality of terminals of the satellite communications network, the second plurality of terminals located within a second geographical region serviced by a second beam of the plurality of beams; and
        generate per-beam bandwidth resource request data based at least in part on the received bandwidth resource requests, the per-beam resource request data including first resource request data associated with the first plurality of terminals and second resource request data associated with the second plurality of terminals;
    an allocation module configured to identify allocatable bandwidth resources comprising a plurality of time slots of a frequency bandwidth for a defined time duration; and
    an assignment module, communicatively coupled with the allocation module and the request compilation module, and configured to:
        assign a first subset of the plurality of time slots of the allocatable bandwidth resources to the first beam of the plurality of beams according to the first resource request data; and
        assign a second subset of the plurality of time slots of the allocatable bandwidth resources to the second beam of the plurality of beams according to the second resource request data.

2. The system of claim 1, wherein time slots of the first subset of the plurality of time slots of the allocatable bandwidth resources are not assigned to any other beams of the plurality of beams for the defined time duration.

3. The system of claim 1, wherein the assignment module assigns the first and second subsets of the plurality of time slots of the allocatable bandwidth resources to the first and second beams based at least in part on service level agreements of terminals associated with the first and second beams.

4. The system of claim 1, wherein the plurality of time slots of the frequency bandwidth comprise portions of a frequency channel.

5. The system of claim 1, wherein the request compilation module, the allocation module, and the assignment module are located in a control unit of a satellite of the satellite communications network.

6. The system of claim 1, wherein the assignment module is further configured to provide an assignment order preference to one of the first beam or the second beam based on a determination of whether the first beam or the second beam has a larger amount of requested bandwidth resources remaining to be assigned for the defined time duration.

7. The system of claim 1, wherein coverage areas for the first and second beams of the plurality of beams comprise overlapping coverage areas.

8. A method for dynamically assigning bandwidth resources to a plurality of beams in a satellite communications network, the method comprising:
    receiving resource requests from a first plurality of terminals of the satellite communication network, the first plurality of terminals located within a first geographical region serviced by a first beam of the plurality of beams;
    receiving resource requests from a second plurality of terminals of the satellite communications network, the second plurality of terminals located within a second geographical region serviced by a second beam of the plurality of beams;
    generating per-beam resource request data for the plurality of beams based at least in part on the received resource requests, the per-beam resource request data including first resource request data associated with the first plurality of terminals and second resource request data associated with the second plurality of terminals;
    identifying allocatable bandwidth resources comprising a plurality of time slots of a frequency bandwidth for a defined time duration;
    assigning a first subset of the time slots of the allocatable bandwidth resources to the first beam of the plurality of beams according to the first resource request data; and
    assigning a second subset of the time slots of the allocatable bandwidth resources to the second beam of the plurality of beams according to the second resource request data.

9. The method of claim 8, wherein the allocatable bandwidth resources comprise uplink and downlink allocatable bandwidth resources.

10. The method of claim 9, wherein the first and second subsets of the time slots of the allocatable bandwidth resources comprise subsets of the downlink allocatable bandwidth resources.

11. The method of claim 8, wherein time slots of the first subset of the plurality of time slots of the allocatable bandwidth resources are not assigned to any other beams of the plurality of beams for the defined time duration.

12. The method of claim 8, wherein assigning the first and second subsets of the plurality of time slots of the allocatable bandwidth resources to the first and second beams is based at least in part on service level agreements of terminals associated with the first and second beams.

13. The method of claim 8, wherein the plurality of time slots of the frequency bandwidth comprise portions of a frequency channel.

14. The method of claim 8, wherein the assigning of the first and second subsets of the time slots of the allocatable bandwidth resources comprises providing an assignment order preference to one of the first beam or the second beam based on a determination of whether the first beam or second beam has a larger amount of requested bandwidth resources remaining to be assigned for the defined time duration.

15. An apparatus for dynamically assigning bandwidth resources to a plurality of beams in a satellite communications network, the apparatus comprising:
- means for receiving resource requests from a first plurality and a second plurality of terminals of the satellite communication network, the first plurality of terminals located within a first geographical region serviced by a first beam of the plurality of beams and the second plurality of terminals located within a second geographical region serviced by a second beam of the plurality of beams;
- means for generating per-beam resource request data for the plurality of beams based at least in part on the received resource requests, the per-beam resource request data including first resource request data associated with the first plurality of terminals and second resource request data associated with the second plurality of terminals;
- means for identifying allocatable bandwidth resources comprising a plurality of time slots of a frequency bandwidth for a defined time duration;
- means for assigning a first subset of the time slots of the allocatable bandwidth resources to the first beam of the plurality of beams according to the first resource request data; and
- means for assigning a second subset of the time slots of the allocatable bandwidth resources to the second beam of the plurality of beams according to the second resource request data.

16. The apparatus of claim 15, wherein the allocatable bandwidth resources comprise uplink and downlink allocatable bandwidth resources.

17. The apparatus of claim 16, wherein the first and second subsets of the time slots of the allocatable bandwidth resources comprise subsets of the downlink allocatable bandwidth resources.

18. The apparatus of claim 15, wherein time slots of the first subset of the plurality of time slots of the allocatable bandwidth resources are not assigned to any other beams of the plurality of beams for the defined time duration.

19. The apparatus of claim 15, wherein the plurality of time slots of the frequency bandwidth comprise portions of a frequency channel.

20. The apparatus of claim 15, wherein the means for assigning the first and second subsets comprises means for providing an assignment order preference to one of the first beam or the second beam based on a determination of whether the first beam or the second beam has a larger amount of requested bandwidth resources remaining to be assigned for the defined time duration.

* * * * *